United States Patent [19]
Kercher

[11] Patent Number: 5,690,473
[45] Date of Patent: Nov. 25, 1997

[54] TURBINE BLADE HAVING TRANSPIRATION STRIP COOLING AND METHOD OF MANUFACTURE

[75] Inventor: David Max Kercher, Ipswich, Mass.

[73] Assignee: General Electric Company, Cincinnati, Ohio

[21] Appl. No.: 935,066

[22] Filed: Aug. 25, 1992

[51] Int. Cl.$^6$ ........................................ F01D 5/18
[52] U.S. Cl. ................... 416/97 A; 416/231 R; 415/115
[58] Field of Search ..................... 416/95, 96 R, 416/96 A, 97 R, 97 A, 231 R; 415/115

[56] References Cited

U.S. PATENT DOCUMENTS

| | | | |
|---|---|---|---|
| 3,011,760 | 12/1961 | Eckert | 253/39.15 |
| 3,213,527 | 10/1965 | Glaze | 416/97 |
| 3,644,060 | 2/1972 | Bryan | 416/231 |
| 3,647,316 | 3/1972 | Moskowitz | 416/231 |
| 3,656,863 | 4/1972 | DeFeo | 416/97 |
| 3,810,711 | 5/1974 | Emmerson et al. | 416/97 |
| 4,067,662 | 1/1978 | Rossmann | 416/97 A |
| 4,376,004 | 3/1983 | Bratton et al. | 416/97 A |
| 4,422,229 | 12/1983 | Sadler et al. | 29/156.8 H |
| 4,684,323 | 8/1987 | Field | 415/115 |
| 4,738,588 | 4/1988 | Field | 415/115 |
| 5,203,873 | 4/1993 | Corsmeier et al. | 416/96 A |
| 5,253,976 | 10/1993 | Cunha | 415/115 |
| 5,340,274 | 8/1994 | Cunha | 415/115 |
| 5,370,499 | 12/1994 | Lee | 416/97 R |

FOREIGN PATENT DOCUMENTS

| | | | |
|---|---|---|---|
| 19 959 | 2/1980 | Japan | 416/97 A |
| 47 103 | 3/1983 | Japan | 416/97 R |

OTHER PUBLICATIONS

R.J. Goldstein et al, "Film–Cooling Effectiveness with Injection Through a Porous Section," 29 Nov.–4 Dec. 1964, ASME 64–WA/HT–30, pp. 1–11.

J. Starkenberg, "Boundary Layer Transition on a Film–Cooled Slender Cone," 20–22 Jan. 1975, AIAA Paper 75–194, pp. cover, 1–10.

*Primary Examiner*—Michael J. Carone
*Assistant Examiner*—Christopher K. Montgomery
*Attorney, Agent, or Firm*—Andrew C. Hess; Wayne O. Traynham

[57] ABSTRACT

A gas turbine engine turbine blade and method of manufacture includes an airfoil having pressure and suction sides joined together at leading and trailing edges. The airfoil further includes a supply channel for receiving compressed air, and has an elongate recess disposed in at least one of the pressure and suction sides which is separated from the supply channel by a partition. The partition includes a plurality of spaced apart flow metering holes disposed in flow communication with the supply channel. A transpiration strip is fixedly joined to the airfoil in the recess and spaced from the partition to define a plenum for receiving the compressed air from the metering holes. The transpiration strip is pervious for channeling the compressed air from the plenum in a blanket of film cooling boundary layer air therefrom.

11 Claims, 4 Drawing Sheets

TURBINE BLADE HAVING TRANSPIRATION STRIP COOLING AND METHOD OF MANUFACTURE

The present invention relates generally to gas turbine engine turbine blades, and, more specifically, to a turbine blade having improved cooling.

BACKGROUND OF THE INVENTION

A conventional gas turbine engine includes a compressor for providing compressed air to a combustor wherein it is mixed with fuel and ignited for generating combustion gases. The combustion gases are channeled firstly through a high pressure turbine and typically through a low pressure turbine disposed downstream therefrom for extracting energy to drive the compressor and provide output power in the form of a combustion gas exhaust jet or shaft power for rotating a fan for generating thrust for powering an aircraft in flight. The efficiency of the engine is directly related to the high pressure turbine inlet temperature of the combustion gases channeled thereto. Since the combustion gases are considerably hot, the turbine rotor blades are typically hollow and provided with conventional film cooling holes for providing effective cooling thereof for ensuring a useful operating life. A portion of the compressed air from the compressor is suitably channeled to the turbine blades for cooling, and since such compressed air does not undergo combustion in the combustor, the net efficiency of the engine is decreased.

Accordingly, turbine blades are continually being improved for reducing the required amount of compressor cooling air channeled thereto for improving overall efficiency of the engine while still providing acceptable of the blade. For example, in advanced gas turbine engines being presently considered, substantial reductions in cooling flow of the turbine blades is being considered along with a substantial increase in the turbine rotor inlet temperature for substantially improving the operating efficiency of the engine. This, therefore, will require a substantial increase in heat transfer effectiveness in cooling the turbine blades using the reduced amount of cooling flow.

A conventional turbine blade includes a concave pressure side and a convex suction side over which the static pressure of the combustion gases channeled thereover varies significantly. Compressed air is conventionally channeled upwardly through the blade dovetail and into conventional serpentine passages through the blade airfoil for convection cooling thereof. The several passages within the blade airfoil may have various heat transfer enhancement turbulator ribs or pins for increasing the heat transfer coefficient over that for a smooth wall. Furthermore, conventional film cooling holes are selectively provided around the surface of the airfoil as required for forming suitable film cooling air layers to protect the airfoil against the hot combustion gases. Since the leading edge of the airfoil is typically subjected to the highest heat flux from the combustion gases, it requires the greatest protection from the heat and a correspondingly high heat transfer enhancement from the compressed air being channeled through the airfoil.

Furthermore, the turbine blade must also be designed to provide an adequate backflow margin to ensure that the combustion gases are not allowed to backflow through the film cooling holes into the blade airfoil during operation. The pressure of the compressed air inside the airfoil is, therefore, predeterminedly selected to be suitably larger than the pressure of the combustion gases flowing over the outer surface of the airfoil to ensure the outward flow of the compressed air from the interior of the airfoil through the film cooling holes to the exterior of the airfoil. Since the leading edge region of a typical high pressure turbine blade typically includes film cooling holes along both the pressure and suction sides of the airfoil, the pressure of the compressed air inside the airfoil must be suitably large to provide an effective backflow margin through the pressure side film cooling holes adjacent the leading edge which are subject to the highest pressure from the combustion gases flowable over the airfoil. However, since the pressure of the combustion gases channeled over the suction side of the airfoil is necessarily lower than that over the pressure side, the pressure ratio of the compressed air inside the airfoil relative to the suction side adjacent the leading edge is relatively high, and higher than the pressure ratio across the pressure side at the leading edge, which increases the ejection velocity of the film cooling air to the suction side leading edge film cooling holes. This may lead to a condition known as blowoff wherein the film cooling air initially breaks free from the airfoil suction side as it is ejected from the film cooling holes before reattaching to the suction side downstream therefrom. This leads to a decrease in the air film effectiveness and cooling capability of the film cooling air in this region.

In the above situation, the blowoff external heat transfer coefficient increases and the film cooling effectiveness of the compressed air channeled through the film holes decreases, which requires even more air, for example, to ensure acceptable cooling of the turbine blade, which decreases overall efficiency. Furthermore, it is desirable to channel the compressed air through the airfoil with as little pressure loss therein as possible to further increase the overall efficiency of the engine.

Conventional film cooling holes are discrete and spaced apart from each other and, therefore, initially provide a discontinuous flow of the film cooling air until the individual discharge jets join together downstream with each other to form a substantially continuous boundary layer of film cooling air on the pressure surface but not necessarily on the suction surface. In contrast, conventionally known transpiration cooling uses a porous or screen-like metal external skin for a turbine blade for increasing the uniformity of the film cooling boundary layer discharged therefrom for further improving cooling effectiveness of the blade. However, since a turbine rotor blade, for example, is subject to relatively high centrifugal forces during operation, the transpiration member must be suitably mechanically joined to the blade to withstand the centrifugal forces for obtaining a suitable useful life. Furthermore, suitable flow metering structures are also required to ensure the relatively uniform flow over the extent of the transpiration member during operation for obtaining effective cooling. However, conventional transpiration cooled blades require relatively complex manufacturing procedures and designs for attaching the transpiration external skin onto internal spars of the load carrying member of the blade main body. The load carrying member of the blade first receives the compressed cooling air for channeling it to the transpiration skin and is thus maintained at unnecessarily low temperatures which provides inefficient over-cooling of the load carrying internal spars. Yet further, the distribution of cooling air through the blade airfoil transpiration skin is typically undesirably non-uniform due to the significant variation of the airfoil external surface static pressure distribution.

SUMMARY OF THE INVENTION

A gas turbine engine turbine blade and method of manufacture includes an airfoil having pressure and suction sides joined together at leading and trailing edges. The airfoil further includes a supply channel for receiving compressed air, and has an elongate recess disposed in at least one of the pressure and suction sides which is separated from the supply channel by a partition. The partition includes a plurality of spaced apart flow metering holes disposed in flow communication with the supply channel. A transpiration strip is fixedly joined to the airfoil in the recess and spaced from the partition to define a plenum for receiving the compressed air from the metering holes. The transpiration strip is pervious for channeling the compressed air from the plenum in a blanket of film cooling boundary layer air therefrom.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
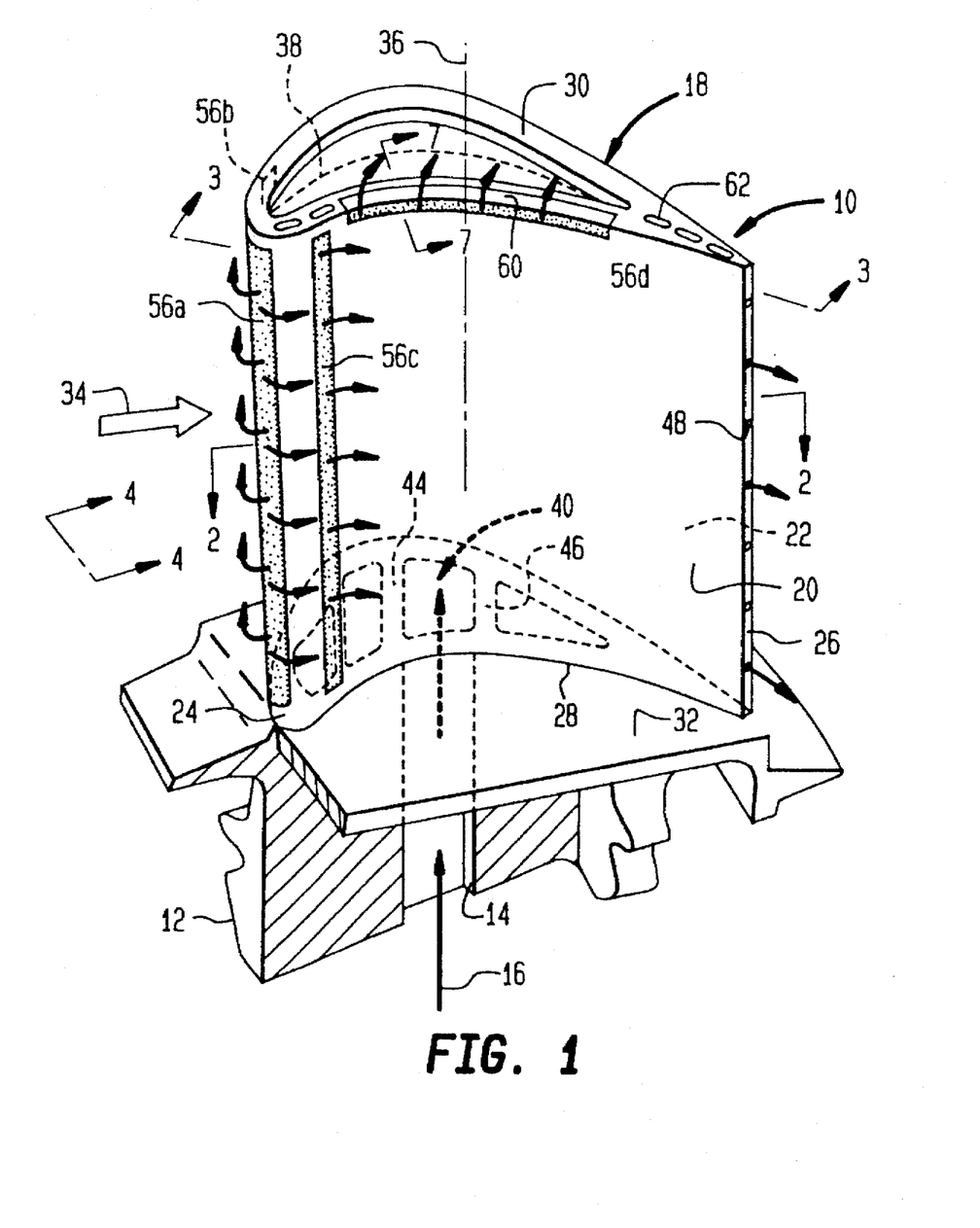
FIG. 1 is a schematic, perspective view of an exemplary gas turbine engine turbine blade having cooling air transpiration strips in accordance with one embodiment of the present invention.

Illustrated in FIG. 1 is an exemplary embodiment of a gas turbine engine, high pressure turbine rotor blade 10 having a conventional dovetail 12 for joining the blade 10 to a conventional rotor disk (not shown) having complementary dovetail slots through which are axially inserted the dovetails 12. In this exemplary embodiment, the dovetail 12 includes a single inlet channel 14 for receiving relatively cool, compressed air 16 from a conventional gas turbine engine compressor (not shown).

The blade 10 further includes an airfoil 18 having a first, outwardly concave, pressure side 20 and a second, outwardly convex, suction side 22 joined together at a leading edge 24 and a trailing edge 26 spaced axially therefrom, with the sides 20, 22 extending longitudinally or radially from a root 28 to a radially outer tip 30. The root 28 is integral with the top of the dovetail 12, with the blade 10 further including a conventional platform 32 at the root 28, which platform 32 provides a portion of the radially inner boundary for combustion gases 34 which are conventionally channeled over the airfoil 18 from the leading edge 24 to the trailing edge 26. As the combustion gases 34 are channeled over the airfoil 18 they effect a relatively high pressure on the airfoil pressure side 20 and a relatively low pressure on the airfoil suction side 22 which is used for rotating the disk containing the blades 10 in conventional fashion.

The profile of the airfoil 18 illustrated in FIG. 1 is conventional for providing the differential pressure drop across the airfoil 18 for rotating the rotor disk (not shown) during engine operation. The blade 10 has a longitudinal axis 36 extending in the span direction of the airfoil 18 generally parallel to a radial axis of the engine. Extending between the leading edge 24 and the trailing edge 26 is an arcuate camber or chordal line 38 which is a reference axis along transverse sections of the airfoil 18 in the chord-wise direction.

Figures 2, 3:
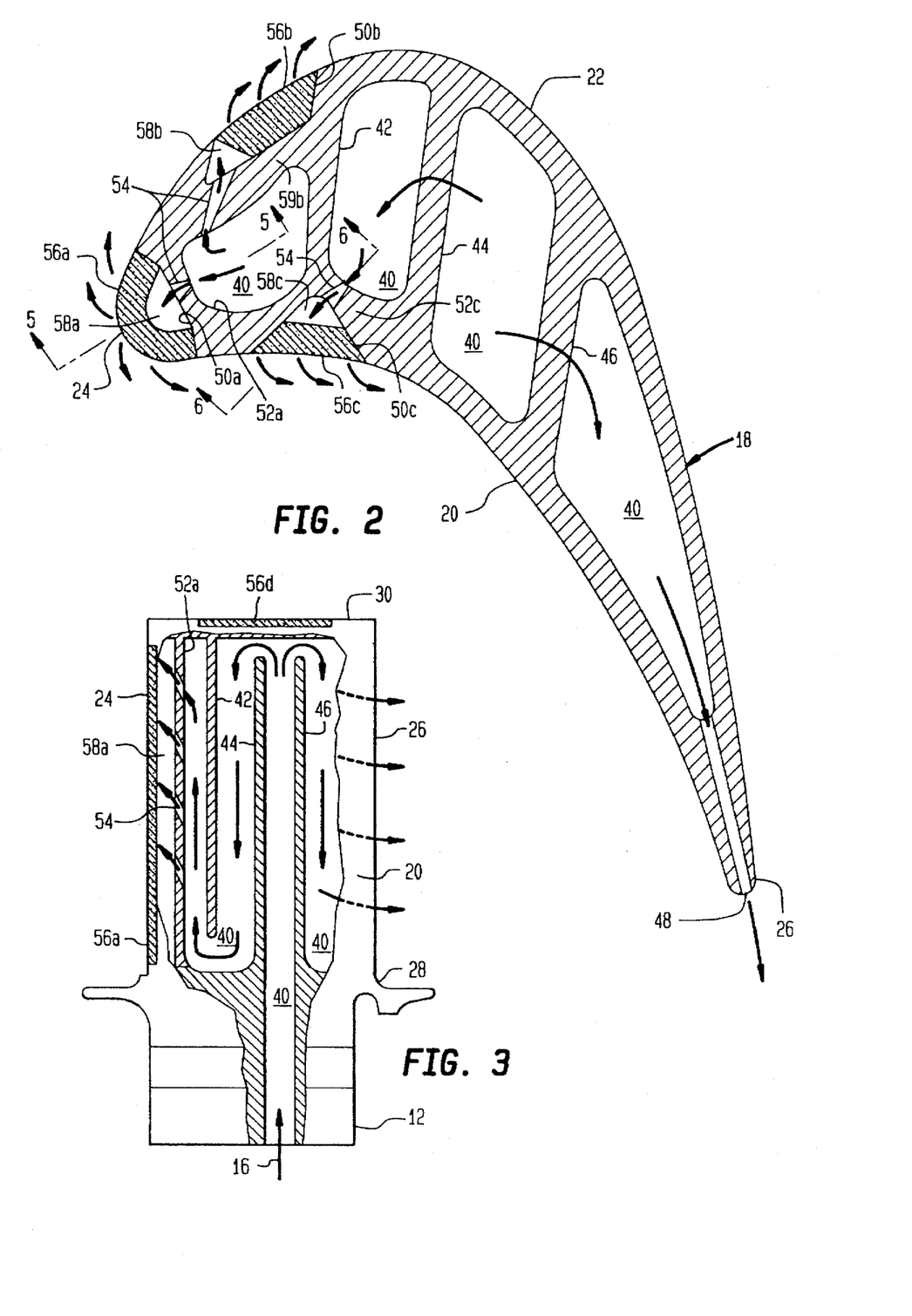
FIG. 2 is a transverse sectional view through the airfoil portion of the blade illustrated in FIG. 1 taken along line 2—2.
FIG. 3 is an elevation view of the pressure side of the blade illustrated in FIG. 1, partly in section, taken generally along line 3—3.

In order to cool the airfoil 18 during operation against the adverse affects of the relatively hot combustion gases 34, an internal supply channel 40 extends through the airfoil 18 in flow communication with the inlet channel 14 for receiving therefrom the compressed air 16 as shown in more particularity in FIGS. 2 and 3. The supply channel 40 may have any conventional configuration and is typically a serpentine channel as shown and defined, for example, by first, second, and third longitudinally extending ribs 42, 44, and 46 which are axially or chordally spaced apart from each other for channeling the compressed air 16 therebetween. The compressed air 16 is channeled both in an aft direction toward the trailing edge 26 and through a plurality of conventional trailing edge holes 48, and forwardly toward the leading edge 24 for improved cooling in accordance with one embodiment of the present invention.

Figure 4:
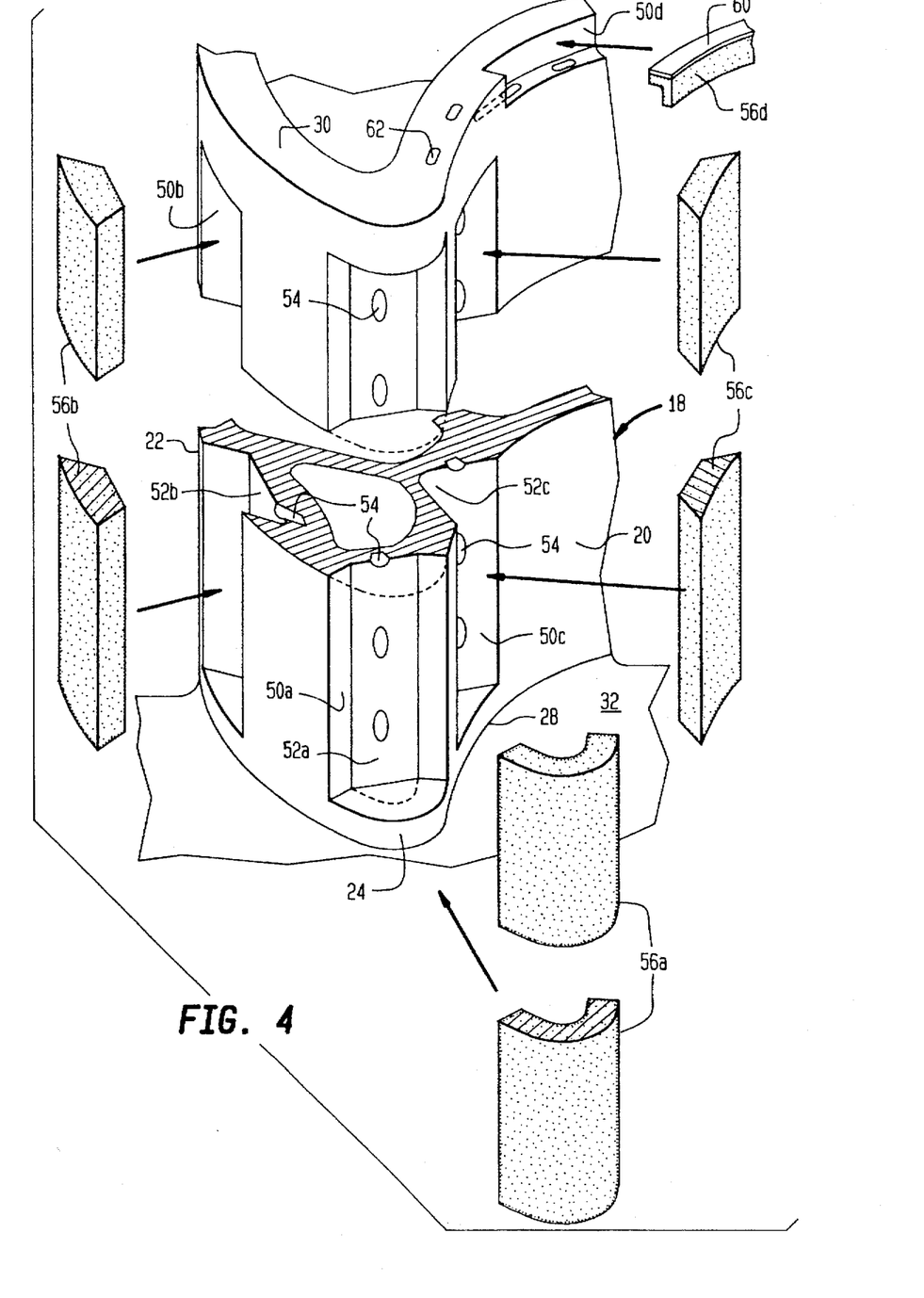
FIG. 4 is an exploded perspective view of the leading edge portion of the blade illustrated in FIG. 1 taken generally along line 4—4.

More specifically, and referring to FIGS. 1, 2, and 4, the airfoil 18 includes a longitudinally elongate first recess 50a disposed in at least one of the pressure and suction sides 20, 22, and in this exemplary embodiment is disposed along the leading edge 24 with substantially equal portions extending in an aft direction along both the pressure and suction sides 20 and 22. The first recess 50a may be conventionally machined into the airfoil 18, or the blade 10 may be manufactured by first providing the hollow airfoil 18 having the internal supply channel 40 as a conventional casting, with the first recess 50a either being machined therein or provided as part of the initial casting. The outer profile of the airfoil 18 as illustrated in FIG. 2 is a conventional aerodynamic, crescent shape as required for a particular design for effecting suitable lift across the airfoil 18 from the pressure side 20 to the suction side 22. The first recess 50a is formed relative to the required outer profile of the airfoil 18.

The first recess 50a is separated from the supply channel 40 by a longitudinally extending first partition 52a which includes a plurality of longitudinally spaced apart flow metering holes 54 disposed in flow communication with the supply channel 40 for receiving therefrom the compressed air 16. A longitudinally elongate first, or leading edge transpiration strip 56a is conventionally fixedly joined to the airfoil 18 in the first recess 50a by laser welding, for example. The first strip 56a is preferably spaced perpendicularly from the first partition 52a, as illustrated more clearly in FIG. 2, to define a first plenum 58a therebetween for receiving the compressed air 16 from the metering holes 54.

The airfoil 18 is preferably manufactured by first forming by conventional laser drilling, for example, the metering holes 54 through the first partition 52a prior to the assembly of the first strip 56a thereto. As illustrated in FIG. 4 in blowup, prior to assembly of the first strip 56a into the first recess 50a, the entire first recess 50a is accessible, and, therefore, the metering holes 54 may be conventionally formed through the accessible first partition 52a. The first strip 56a may then be positioned in the entire extent of the first recess 50a and then laser welded along its sides to the parent metal of the airfoil 18.

Referring again to FIGS. 1 and 2, the first strip 56a extends longitudinally along the airfoil 18 from adjacent the root 28 to the tip 30 at the leading edge 24, and has a transversely arcuate outer profile disposed coextensively with the airfoil pressure and suction sides 20, 22 to provide the required aerodynamic profile for smoothly separating flow of the combustion gases 34 over the pressure and suction sides 20, 22. The outer profile of the first strip 56a is preselected so that when the first strip 56a is secured to the airfoil 18, the outer surface of the airfoil 18 is continuous and has the required leading edge 24 and outer profile for a particular design application for smooth flow of the combustion gases 34 thereover. Since the leading edge 24 of the turbine blade 10 typically experiences the highest heat flux from the combustion gases 34, the first strip 56a may be provided along the leading edge 24 for providing conventionally known transpiration cooling therefrom. The compressed air 16 is channeled from the first plenum 58a and through the first strip 56a at the leading edge 24 and aft therefrom along both the pressure side 20 and the suction side 22 for providing a substantially longitudinally continuous film cooling air blanket. Instead of the initially discontinuous film cooling air provided from conventional spaced apart discrete film cooling holes typically provided along a blade leading edge, the first strip 56a provides an improved, continuous blanket of air for improving the cooling ability of the compressed air 16 discharged therefrom.

Although transpiration cooling is conventionally known, the use of the first strip 56a provides selective transpiration cooling where desired in an improved structural combination capable of withstanding centrifugally and thermally induced stresses during operation of the blade 10 in a turbine rotor, for example. The first recess 50a is provided in the parent material of the airfoil 18 and extends in the longitudinal direction with a relatively high length-to-width ratio. The first strip 56a is complementary in configuration and, therefore, provides a relatively long interface with the parent airfoil 18 around the perimeter of the first strip 56a which is preferably conventionally laser welded to the airfoil 18 along the sides of the first strip 56a. The resulting combination provides the structural integrity and support of the airfoil 18 to securely mount the first strip 56a thereto for withstanding centrifugally induced stress. And, the combination also reduces the temperature differential between the first strip 56a itself and the first recess 50a of the airfoil 18 to which it is directly joined for reducing thermally induced stresses therebetween.

The first transpiration strip 56a may be formed of any conventional porous metal such as porous nickel, or that known under the trademark Porolloy by Bendix Corporation, for examples. The first strip 56a, as shown in FIG. 2 for example, is pervious for channeling the compressed air 16 from the first plenum 58a through the first strip 56a as a substantially continuous and uninterrupted film cooling boundary layer or blanket of cooling air along both the pressure and suction sides 20 and 22 from the leading edge 24.

Conventional transpiration materials are known to diffuse cooling air for reducing their velocity and providing a more effective film cooling blanket of cooling air. In accordance with one object of the present invention, the first plenum 58a is provided for channeling thereto the compressed air 16 from the supply channel 40 to further diffuse the compressed air 16 and reduce its velocity in the first plenum 58a for improving the uniformity of passage of the compressed air 16 through the first strip 56a. The first plenum 58a also allows a more uniform cavity pressure for more uniformly driving the compressed air 16 through the first strip 56a for improved cooling performance.

Figure 5:
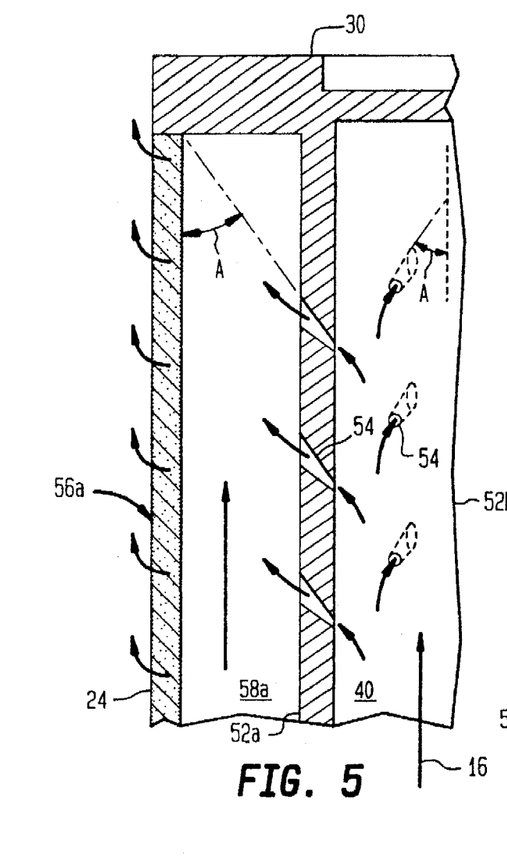
FIG. 5 is an elevational, partly sectional view of a portion of the airfoil illustrated in FIG. 2 taken along line 5—5.

More specifically, and referring to FIG. 5, the metering holes 54 are preferably inclined at an acute angle A of about 30°, for example, relative to the longitudinal axis of the first strip 56a for reducing the impingement velocity perpendicularly against the first strip 56a. The metering holes 54 are also preferably tapered with a reduced area inlet in flow communication with the supply channel 40 and a larger area outlet in flow communication with the first plenum 58a for diffusing therein the compressed air 16 received from the supply channel 40 to further reduce the impingement velocity of the compressed air 16 in the first plenum 58a perpendicularly against the first strip 56a. The metering holes 54 may be conventionally laser drilled with a generally conical configuration to diffuse the compressed air 16 channeled therethrough into the first plenum 58a to reduce its velocity while increasing its static pressure. The static pressure of the compressed air 16 within the first plenum 58a may be suitably selected for providing adequate backflow margin to prevent backflow of the combustion gases 34 through the first strip 56a and into the first plenum 58a. With a suitable backflow margin, the compressed air 16 in the first plenum 58a will flow solely outwardly through the first strip 56a for providing transpiration cooling on the external surface of the first strip 56a and film cooling thereafter on pressure and suction sides 20 and 22.

By reducing direct impingement of the compressed air 16 discharged from the metering holes 54 perpendicularly against the inner surface of the first strip 56a, the corresponding pressure ratio across the first strip 56a will be more uniformly reduced for thusly providing a more uniform driving pressure across the entire surface of the first strip 56a to ensure a relatively uniform transpiration boundary layer airflow being discharged therefrom. The first strip 56a, therefore, predeterminedly meters and diffuses the cooling compressed air 16 through its relatively large porous surface area in order to lower the ejection velocity thereof and thus lay down an effective boundary layer of air along the airfoil pressure and suction sides 20 and 22 from the leading edge 24.

In order to eliminate the blowoff problem addressed in the Background section, another, or second transpiration strip 56b may be used in addition to the first strip 56a as shown, for example, in FIGS. 2 and 4. The second strip 56b preferably extends longitudinally along the airfoil 18 from adjacent the root 28 to adjacent the tip 30 and is spaced chordally aft of the leading edge 24 and aft of the first strip 56a on the airfoil suction side 22. The region of the second strip 56b is subject to a relatively low pressure in the combustion gases 34 due to acceleration and high velocities over the suction side 22 which conventionally leads to the possibility of blowoff where a relatively high pressure is provided in the compressed air 16 within the airfoil 18 for obtaining adequate backflow margin. However, by providing the second strip 56b in a complementary second recess 50b with a corresponding second plenum 58b disposed in flow communication with an additional row of the angled and tapered metering holes 54 through a corresponding second partition 52b (see FIG. 5 also), the velocity of the compressed air 16 channeled through the metering holes 54 may impinge with nearly uniform low velocity on the internal surface of second strip 56b and therefore the pressure ratio through the second strip 56b may be reduced to ensure the uniform ejection velocity thereof from the second strip 56b which by virtue of the transpiration strip 56b will prevent blowoff from occurring. The second strip 56b and its related structures is substantially identical in structure and function to the first strip 56a for providing the compressed air 16 into the second plenum 58b with a reduced velocity, relatively uniformly along the longitudinal extent of the second strip 56b, and at a suitable static pressure for driving the compressed air 16 through the second strip 56b with adequate backflow margin while providing a relatively uniform transpiration boundary layer blanket of cooling air therefrom. The outer profile of the second strip 56b is disposed coextensively with the airfoil suction side 22 for providing a smooth and uninterrupted contour for proper aerodynamic performance of the suction side 22.

The second strip 56b is also effective for re-energizing the thermal boundary layer of air flowing from the first strip 56a to increase its thickness and allowing the boundary layers of cooling air flow to maintain a higher film cooling effectiveness aft therefrom along the suction side 22. The first and second strips 56a and 56b therefore provide in combination an improved arrangement for providing transpiration cooling re-energized by the second strip 56b for improving the cooling of the airfoil 18 against the high heat flux from the combustion gases 34 being channeled thereover.

Figure 6:
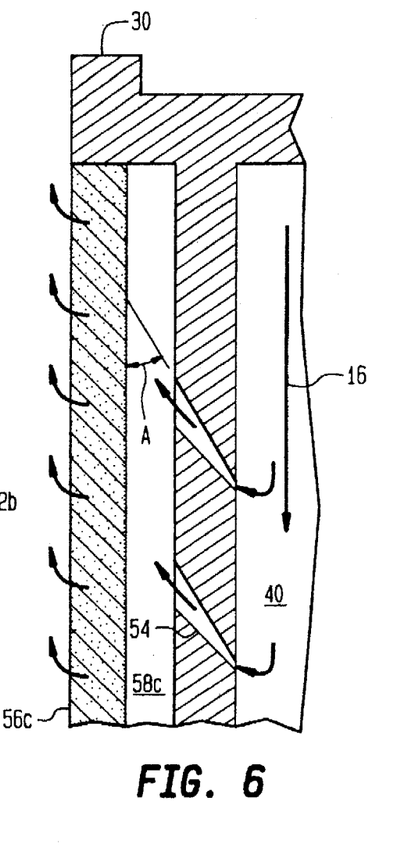
FIG. 6 is an elevational sectional view of a portion of the airfoil illustrated in FIG. 2 taken along line 6—6.

Furthermore, yet another, third transpiration strip 56c may be spaced chordally aft of the leading edge 24 and the first strip 56a on the airfoil pressure side 20 as shown in FIGS. 2 and 4. The third strip 56c similarly extends longitudinally along the airfoil 18 from adjacent the root 28 to adjacent the tip 30 and has an outer profile disposed coextensively with the airfoil pressure side 20 for forming a smooth and continuous surface as aerodynamically required for the pressure side 20. The third strip 56c is similarly fixedly joined in a complementary third recess 50c having a third partition 52c separating it from the supply channel 40. Another row of the metering holes 54 is provided through the third partition 52c for channeling therethrough the compressed air 16 from the supply channel 40. The third strip 56c is similarly spaced from the third partition 52c to define a third plenum 58c which receives the compressed air 16 from the metering holes 54. The structure and function of the third strip 56c and its corresponding structures is substantially identical to those of the first and second strips 56a and 56b. Since blowoff is also a concern for discrete holes on the airfoil pressure side 20, and the heat flux from the combustion gases 34 is also relatively high, the third strip 56c provides the relatively low velocity transpiration boundary layer of air, and downstream film cooling, for improved cooling on pressure surface 20 without blowoff. The third strip 56c similarly re-energizes the thermal boundary layer provided by the first strip 56a which flows downstream therefrom along the pressure side 20 for providing improved cooling along the pressure side 20 in the midchord and trailing edge region of the airfoil 18. Again, suitable backflow margin may be maintained across the third strip 56c as required by properly sizing metering holes 54. As shown in FIG. 6, the metering holes 54 are similarly inclined at the acute angle A and are similarly tapered for reducing the velocity of the compressed air 16 channeled into the third plenum 58c and providing a more uniform flow of the compressed air 16 along the longitudinal direction and transversely through the third strip 56c.

The first, second, and third transpiration strip 56a–c described above are all disposed longitudinally along the span direction of the airfoil 18 for providing relatively uniform blankets of cooling air in the transverse direction from the leading edge 24 toward the trailing edge 26 along the pressure and suction sides 20, 22. However, FIGS. 1, 3, 4, and 7, illustrate yet another embodiment of the invention including a fourth transpiration strip 56d extending chordally or transversely along the airfoil tip 30 on the airfoil pressure side 20 for providing improved cooling of the airfoil tip 30. In this preferred embodiment, a generally right-angled (i.e. 90°) fourth recess 50d is formed at the junction of the airfoil tip 30 and the airfoil pressure side 20 to provide a suitable ledge therein which forms a fourth partition 52d with the supply channel 40. Another row of chordally spaced apart tapered metering holes 54 also at an acute inclination angle relative to the longitudinal extent of the fourth strip 56d is provided through the fourth partition 52d in flow communication between the supply channel 40 and a fourth plenum 58d defined between the fourth partition 52d and the fourth strip 56d.

Again, the structure and function of the fourth strip 56d and its cooperating structures are substantially identical to those of the first, second, and third strips 56a–c for channeling the compressed air 16 through the metering holes 54 to diffuse the compressed air 16 for reducing its velocity within the fourth plenum 58d and for providing a relatively uniform transpiration boundary layer blanket of air along the fourth strip 56d and film cooling over tip 30. Whereas the first three strips 56a–c extend longitudinally relative to the span or longitudinal axis 36 of the airfoil 18, the fourth strip 56d extends transversely thereto and generally along the chordal line 38. In this way, the fourth strip 56d may discharge the compressed air 16 along a substantial extent of the tip 30 for providing effective cooling thereof.

Since the combustion gases 34 on the airfoil pressure side 20 tend to leak over the airfoil tip 30 toward the suction side 22 during operation, it is preferred that the compressed air 16 discharged from the fourth strip 56d be discharged solely toward the pressure side 20 and not radially outwardly toward the tip 30.

Figure 7:
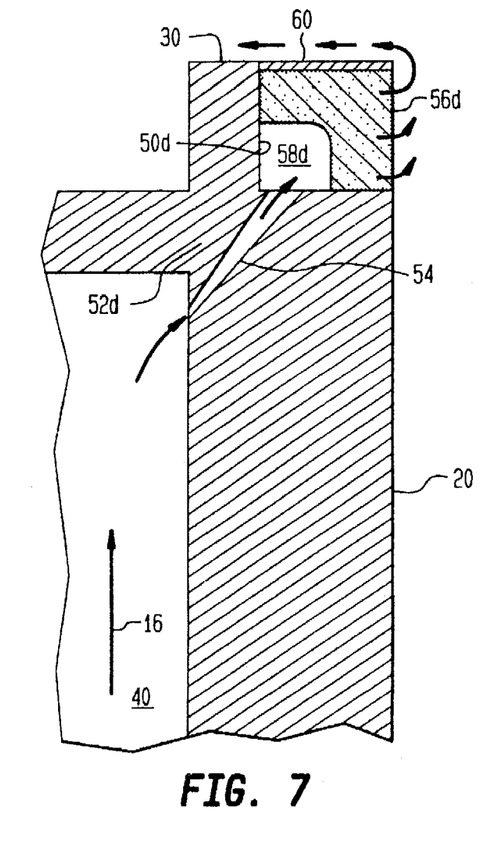
FIG. 7 is an elevational sectional view of a portion of the blade illustrated in FIG. 1 taken along line 7—7.

More specifically, the fourth strip 56d has a generally L-shaped outer profile in this exemplary embodiment, with the pressure side thereof being disposed coextensively with the airfoil pressure side 20, and the radially top side thereof being disposed substantially coextensively with the airfoil tip 30 as shown in FIG. 7, for example. The fourth strip 56d preferably includes an imperforate cap 60 on its top side at the airfoil tip 30 for preventing discharge of the compressed air 16 therethrough and diverting the compressed air 16 to flow transversely through the fourth strip 56d for discharge therefrom solely along the airfoil pressure side 20. Accordingly, the compressed air 16 is forced to flow initially from the fourth strip 56d outwardly from the airfoil pressure side 20 and then is caused to turn around over the cap 60 for flow along the airfoil tip 30 to the suction side 22. In this way, more effective film cooling of the airfoil tip 30 may be obtained. The cap 60 may be formed of a conventional material, such as that used for the blade 10 itself, for preventing flow of the compressed air therethrough and being suitable for accommodating any conventional tip rub with a corresponding stator shroud (not shown) as is conventionally known.

The length of the fourth strip 56d may be as desired for particular design applications and may extend the complete extent from the leading edge 24 to the trailing edge 26 at the tip 30. In the embodiment illustrated in FIG. 1, the fourth strip 56d begins immediately downstream from the third strip 56c and ends upstream from the trailing edge 26. Conventional tip holes 62 may be provided in the tip 30 on the pressure side 20 forward and aft of the fourth strip 56d as required for cooling those portions of the blade tip 30. The tip holes 62 are disposed in flow communication with the internal supply channel 40 and are preferably inclined for ejecting the compressed air 16 as a film cooling boundary layer along the tip 30.

In all of the above embodiments of the invention, the four transpiration strips 56a–d may be used individually or in any combinations thereof including, for example, combinations of the first and second strips 56a and 56b, or a combination of all four strips 56a–d. Each transpiration strip 56a–d provides improved film cooling for improved airfoil cooling, over that obtainable from discrete film cooling holes, which may be used for accommodating even higher temperatures of the combustion gases 34 for improving overall efficiency of the gas turbine engine, or, alternatively, decreasing the required amount of the compressed air 16 channeled through the airfoil 18 for a given temperature of the combustion gases 34 which also increases the overall operating efficiency.

As described above, an improved method of forming the blade 10 includes providing the hollow airfoil 18 and forming in the airfoil 18 the elongate recesses 50a–d separated from the respective supply channels 40 by the respective partitions 52a–d. The method further includes forming by laser drilling for example, the plurality of metering holes 54 through the respective partitions, which are initially imperforate, in flow communication with the supply channel 40. The respective transpiration strips 56a–d may then be conventionally fixedly joined to the airfoil 18 in the respective recesses 50a–d by conventional laser welding. The strips 56a–d are preferably spaced from the respective partitions 52a–d to define the respective plenums 56a–d for receiving the compressed air 16. The resulting airfoil 18, therefore, provides a relatively strong support in the form of the parent airfoil 18 having the recesses 50a–d in which are attached the strips 56a–d in a structurally efficient manner.

The improved rotor blade 10 in accordance with the invention including one or more of the transpiration strips 56a–d allows preselected transpiration cooling on the strips 56a–d themselves and film cooling extending downstream therefrom over the surface of the airfoil 18 as required for high heat flux regions thereof with the remainder of the airfoil 18 being conventional parent material and suitably conventionally cooled. For example, the airfoil 18 may include conventional film cooling holes at selected regions of its outer surface, and may include conventional turbulator ribs and/or pins in the internal serpentine supply channel 40 for enhancing convective heat transfer. If external plugging of any of the transpiration strips 56a–d is considered to be a design limitation, for example, such as the third strip 56c on the concave pressure side 20, such third strip 56c may be replaced by conventional film cooling holes in the original blade design but at the compromise of not achieving the improved cooling therefrom.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, although the invention has been described for an exemplary turbine rotor blade, it could also be used for turbine stator blades or vanes.

Accordingly, what is desired to be secured by Letters Patent of the United States is the invention as defined and differentiated in the following claims:

I claim:

1. A gas turbine engine blade comprising:
    a dovetail for mounting said blade to a rotor disk, and including an inlet channel for receiving compressed air; and
    an airfoil having a pressure side and a suction side joined together at a leading edge and a trailing edge and extending longitudinally from a root to a tip, said root being joined to said dovetail, and said airfoil further comprising:
    a supply channel disposed in flow communication with said inlet channel for receiving said compressed air;
    an elongate recess disposed in at least one of said pressure and suction sides and separated from said supply channel by a partition having a plurality of spaced apart metering holes disposed in flow communication with said supply channel for receiving said compressed air therefrom; and
    a transpiration strip fixedly joined to said airfoil in said recess and spaced from said partition to define a plenum therebetween for receiving said compressed air from said metering holes, said transpiration strip being pervious for channeling said compressed air from said plenum through said transpiration strip to form a film cooling boundary layer, and said transpiration strip being complementary in configuration with said recess and having perimeter sides fixedly joined to said airfoil, and an outer profile disposed coextensively with an outer surface of said airfoil.

2. A blade according to claim 1 wherein said metering holes are inclined at an acute angle relative to said transpiration strip for reducing impingement velocity against said transpiration strip.

3. A blade according to claim 2 wherein said metering holes are tapered for diffusing said compressed air from said supply channel to reduce impingement velocity against said transpiration strip.

4. A blade according to claim 3 wherein said transpiration strip is a first transpiration strip extending longitudinally along said airfoil at said leading edge, and has an arcuate outer profile disposed coextensively with said airfoil pressure and suction sides.

5. A blade according to claim 3 wherein said transpiration strip is a second transpiration strip extending longitudinally along said airfoil and spaced chordally aft of said leading edge on said airfoil suction side, and has an outer profile disposed coextensively with said airfoil suction side.

6. A blade according to claim 3 wherein said transpiration strip is a third transpiration strip extending longitudinally along said airfoil and spaced chordally aft of said leading edge on said airfoil pressure side, and has an outer profile disposed coextensively with said airfoil pressure side.

7. A blade according to claim 3 wherein said transpiration strip is a fourth transpiration strip extending chordally along said airfoil tip on said airfoil pressure side, and has an outer profile disposed coextensively with said airfoil pressure side.

8. A blade according to claim 7 wherein said fourth transpiration strip includes an imperforate cap at said airfoil tip for preventing discharge of said compressed air therethrough and diverting said compressed air to flow transversely through said fourth transpiration strip for discharge therefrom on said airfoil pressure side.

9. A blade according to claim 3 wherein said transpiration strip comprises:
    a first transpiration strip extending longitudinally along said airfoil at said leading edge, and has an arcuate outer profile disposed coextensively with said airfoil pressure and suction sides; and a second transpiration strip extending longitudinally along said airfoil and spaced chordally aft of said leading edge on said airfoil suction side, and has an outer profile disposed coextensively with said airfoil suction side.

10. A blade according to claim 9 further comprising:

a third transpiration strip extending longitudinally along said airfoil and spaced chordally aft of said leading edge on said airfoil pressure side, and has an outer profile disposed coextensively with said airfoil pressure side; and a fourth transpiration strip extending chordally along said airfoil tip on said airfoil pressure side, and has an outer profile disposed coextensively with said airfoil pressure side.

11. A method of manufacturing a gas turbine engine blade comprising:

providing a hollow airfoil including pressure and suction sides joined together at leading and trailing edges and having an internal supply channel for receiving compressed air;

forming an elongate recess in said airfoil and separated from said supply channel by an imperforate partition;

forming a plurality of spaced apart metering holes through said partition in flow communication with said supply channel; and fixedly joining a transpiration strip to said airfoil in said recess and spaced from said partition to define a plenum therebetween for receiving said compressed air, and said transpiration strip being complementary in configuration with said recess and having perimeter sides fixedly joined to said airfoil, and an outer profile disposed coextensively with an outer surface of said airfoil.

* * * * *